(12) United States Patent
Yu et al.

(10) Patent No.: US 9,924,304 B2
(45) Date of Patent: Mar. 20, 2018

(54) INTERCONNECTION METHOD AND SYSTEM OF NETWORKING OF PICONET BASED ON BLUETOOTH LOW ENERGY AND CONVENTIONAL BLUETOOTH

(71) Applicant: HuiZhou TCL Mobile Communication Co., Ltd., HuiZhou (CN)

(72) Inventors: Longjie Yu, HuiZhou (CN); Hai Cai, HuiZhou (CN)

(73) Assignee: HuiZhou TCL Mobile Communication Co., Ltd., HuiZhou (CN)

(*) Notice: Subject to any disclaimer, the term of this patent is extended or adjusted under 35 U.S.C. 154(b) by 0 days.

(21) Appl. No.: 15/309,446

(22) PCT Filed: Apr. 7, 2016

(86) PCT No.: PCT/CN2016/078634
§ 371 (c)(1),
(2) Date: Nov. 8, 2016

(87) PCT Pub. No.: WO2017/000619
PCT Pub. Date: Jan. 5, 2017

(65) Prior Publication Data
US 2017/0208424 A1 Jul. 20, 2017

(30) Foreign Application Priority Data
Jul. 1, 2015 (CN) .......................... 2015 1 0376505

(51) Int. Cl.
*H04B 7/00* (2006.01)
*H04W 4/00* (2018.01)
(Continued)

(52) U.S. Cl.
CPC .......... *H04W 4/008* (2013.01); *H04W 8/005* (2013.01); *H04W 76/023* (2013.01); *H04W 84/20* (2013.01)

(58) Field of Classification Search
CPC .............................. H04W 4/008; H04W 6/005
(Continued)

(56) References Cited

U.S. PATENT DOCUMENTS 8,606,184 B1 12/2013 Luthra
2005/0156022 A1* 7/2005 Hepworth ............ G06K 7/0008
235/375

(Continued)

FOREIGN PATENT DOCUMENTS

CN 1635713 7/2005
CN 103684938 3/2014
(Continued)

*Primary Examiner* — Raj Chakraborty

(57) ABSTRACT

An interconnection method of networking of a Piconet based on Bluetooth low power and conventional Bluetooth is provided. Each of peripheral devices advertise service type information and service address information to the surroundings. The central device generates a peripheral device service list correspondingly according to the serve type information, so as to complete networking between the central device and the plurality of peripheral devices. The central device establishes a conventional Bluetooth connection between the central device and the peripheral device according to a service request, and establishes the Piconet correspondingly to allow any of two devices to be wirelessly connected according to the peripheral device service list.

12 Claims, 5 Drawing Sheets

(51) Int. Cl.
*H04W 8/00* (2009.01)
*H04W 76/02* (2009.01)
*H04W 84/20* (2009.01)

(58) Field of Classification Search
USPC .......................................................... 455/41.2
See application file for complete search history.

(56) References Cited

U.S. PATENT DOCUMENTS

2010/0195539 A1* 8/2010 Tian ...................... H04L 47/824
370/255
2014/0328296 A1* 11/2014 Chen ................... H04W 76/023
370/329
2015/0317626 A1* 11/2015 Ran .................... G06Q 20/3829
705/76

FOREIGN PATENT DOCUMENTS

| CN | 104469660 | 3/2015 |
| CN | 104519493 | 4/2015 |
| CN | 104539323 | 4/2015 |
| CN | 104717603 | 6/2015 |

\* cited by examiner ated filing date of Apr. 7, 2016, which claims the benefit of priority of Chinese Patent Application No. 201510376505.2 filed on Jul. 1, 2015. The contents of the above applications are all incorporated by reference as if fully set forth herein in their entirety.

INTERCONNECTION METHOD AND SYSTEM OF NETWORKING OF PICONET BASED ON BLUETOOTH LOW ENERGY AND CONVENTIONAL BLUETOOTH

RELATED APPLICATIONS

This application is a National Phase of PCT Patent Application No. PCT/CN2016/078634 having International filing date of Apr. 7, 2016, which claims the benefit of priority of Chinese Patent Application No. 201510376505.2 filed on Jul. 1, 2015. The contents of the above applications are all incorporated by reference as if fully set forth herein in their entirety.

FIELD AND BACKGROUND OF THE INVENTION

The present disclosure relates to a smart terminal technology, more particularly, to an interconnection method and system of networking of a Piconet based on Bluetooth low energy and conventional Bluetooth.

With the popularity of electronic devices, an increasing number of smart terminals have been widely used by people. They include, for example, smart TVs, wireless stereo systems, smartphones, tablets, notebooks, computers, wireless routers, wireless cameras, wireless projectors, smart lighting, smart windows, smart curtains, smart refrigerators, smart water heaters, smart printers, etc. These smart terminals having wireless modules are usually used for wireless connection tasks, for example, tasks of WIFI display (realize high-speed video transmission between devices) between smart TVs and smartphones, tasks of video projection between smartphones and wireless projectors, tasks of photo transmission and backup between wireless cameras and wireless routers or computers, tasks of music broadcast between tablets and wireless stereo systems, control tasks between tablets and smart refrigerators or smart water heaters, remote closing tasks between smartphones and smart windows or smart curtains. When these tasks are activated, users usually need to perform setting and connections between a plurality of devices before they can be normally used, which is inconvenient for users. In addition, many users do not know how to set, which causes users much inconvenience.

It is therefore very important to solve the above-mentioned problems.

SUMMARY OF THE INVENTION

The present disclosure provides an interconnection method and system of networking of a Piconet based on Bluetooth low energy and conventional Bluetooth to resolve the problem that the wireless interconnection between two smart terminals is inconvenient in the related art.

The technical solutions according to the present disclosure are as follows:

An interconnection method of networking of a Piconet based on Bluetooth low power and conventional Bluetooth comprises the steps of:

each of a plurality of peripheral devices using a connectable undirected method to periodically and dynamically advertise service type information corresponding to the each of the plurality of peripheral devices and service address information to the surroundings by utilizing advertising packets under a low energy mode; a central device passively scanning and obtaining a Bluetooth address, the serve type information, and the service address information respectively corresponding to the each of the peripheral devices; the service type information being the service type information whether or not supported by a plurality of wireless connections, the service address information being the service address information corresponding to the plurality of wireless connections;

the central device generating a peripheral device service list correspondingly according to the Bluetooth address, the serve type information, and the service address information corresponding to the each of the peripheral devices so as to complete networking between the central device and the plurality of peripheral devices; and the central device establishing a conventional Bluetooth connection between the central device and the peripheral device according to a service request when the central device actively triggers a service or receives a service trigger request of the peripheral device after networking, and establishing the Piconet correspondingly to allow any of two devices to be wirelessly connected according to the peripheral device service list.

An interconnection method of networking of a Piconet based on Bluetooth low power and conventional Bluetooth comprises the steps of:

each of a plurality of peripheral devices using a connectable undirected method to advertise service type information corresponding to the each of the plurality of peripheral devices and service address information to the surroundings under a low energy mode; a central device scanning and obtaining a Bluetooth address, the serve type information, and the service address information respectively corresponding to the each of the peripheral devices; the service type information being the service type information whether or not supported by a plurality of wireless connections, the service address information being the service address information corresponding to the plurality of wireless connections;

the central device generating a peripheral device service list correspondingly according to the Bluetooth address, the serve type information, and the service address information corresponding to the each of the peripheral devices so as to complete networking between the central device and the plurality of peripheral devices; and the central device establishing a conventional Bluetooth connection between the central device and the peripheral device according to a service request after the networking, and establishing the Piconet correspondingly to allow any of two devices to be wirelessly connected according to the peripheral device service list.

In one aspect of the present disclosure, a step of each of a plurality of peripheral devices using a connectable undirected method to advertise service type information corresponding to the each of the plurality of peripheral devices and service address information to the surroundings under a low energy mode; a central device scanning and obtaining a Bluetooth address, the serve type information, and the service address information respectively corresponding to the each of the peripheral devices, comprises:

the each of the plurality of peripheral devices using the connectable undirected method to periodically and dynamically advertise all the service type information and the service address information of the each of the plurality of peripheral devices to the surroundings by utilizing the advertising packets under the low energy mode;

the central device periodically scanning the peripheral devices in a surrounding area, a scanning period being disposed to be the same as an advertising period of all the peripheral devices; and the central device obtaining the Bluetooth address, information of service types being supported, and the service address information corresponding to the each of the plurality of peripheral devices after one round of scanning.

In another aspect of the present disclosure, a step of each of a plurality of peripheral devices using a connectable undirected method to advertise service type information corresponding to the each of the plurality of peripheral devices and service address information to the surroundings under a low energy mode; a central device scanning and obtaining a Bluetooth address, the serve type information, and the service address information respectively corresponding to the each of the peripheral devices, comprises:

the each of the plurality of peripheral devices using the connectable undirected method to periodically and dynamically advertise information of service types supported by the each of the plurality of peripheral devices and the service address information to the surroundings by utilizing the advertising packets under the low energy mode;

the central device periodically scanning the peripheral devices in a surrounding area, a scanning period being set as T, if a number of types of the services supported by a specific peripheral device is x, then an advertising period of the specific peripheral device being $$\frac{256T}{2^{[\log_2 x]}},$$

at the same time, a standby time being $$256T - \frac{256T}{2^{[\log_2 x]}} x,$$

where $[\log_2 x]$ represents a smallest integer that is greater than or equal to $\log_2 x$; and the central device obtaining the Bluetooth address, the information of service types being supported, and the service address information corresponding to the each of the plurality of peripheral devices after one round of scanning.

In another aspect of the present disclosure, a step of the central device establishing a conventional Bluetooth connection between the central device and the peripheral device according to a service request after the networking, and establishing the Piconet correspondingly to allow any of two devices to be wirelessly connected according to the peripheral device service list, comprises:

the central device triggering the service request to transmit connection request signaling to a first peripheral device through the conventional Bluetooth, the first peripheral device transmitting connection response signaling to the central device through the conventional Bluetooth, the central device establishing a connection with the first peripheral device to constitute the Piconet correspondingly;

the central device transmitting connection request signaling to a second peripheral device through the conventional Bluetooth when being kept connected to the first peripheral device by using time-division multiplexing, the second peripheral device transmitting connection response signaling to the central device through the conventional Bluetooth, the central device establishing a connection with the second peripheral device to add the second peripheral device to the Piconet;

the central device transmitting the service type information, the service address information, and master/slave mode information to the first peripheral device and the second peripheral device through the Piconet; and the first peripheral device and the second peripheral device directly performing a wireless interconnection correspondingly according to the service type information, the service address information, and the master/slave mode information transmitted by the central device.

In another aspect of the present disclosure, a step of the central device establishing a conventional Bluetooth connection between the central device and the peripheral device according to a service request after the networking, and establishing the Piconet correspondingly to allow any of two devices to be wirelessly connected according to the peripheral device service list, comprises:

a first peripheral device transmitting connection request signaling to the central device through the conventional Bluetooth when the first peripheral device actively triggers the service request to the central device, the central device transmitting connection response signaling to the first peripheral device, the central device and the first peripheral device establishing a connection;

the first peripheral device transmitting the service type correspondingly to the central device;

the central device looking up a second peripheral device that supports same service type information as the first peripheral device from the peripheral device service list;

the central device transmitting connection request signaling to the second peripheral device through the conventional Bluetooth, the second peripheral device transmitting connection response signaling to the central device, the central device and the second peripheral device establishing a connection to constitute the Piconet correspondingly; and the central device transmitting the service type information, the service address information, and master/slave mode information to the first peripheral device and the second peripheral device through the Piconet; the first peripheral device and the second peripheral device directly performing a wireless interconnection correspondingly according to the service type information, the service address information, and the master/slave mode information transmitted by the central device.

In another aspect of the present disclosure, a step of the central device establishing a conventional Bluetooth connection between the central device and the peripheral device according to a service request after the networking, and establishing the Piconet correspondingly to allow any of two devices to be wirelessly connected according to the peripheral device service list, comprises:

the central device triggering the service request to transmit connection request signaling to a first peripheral device through the conventional Bluetooth, the first peripheral device transmitting connection response signaling to the central device through the conventional Bluetooth, the central device establishing a connection with the first peripheral device;

the central device transmitting the service type information, the service address information, and master/slave mode information to the first peripheral device; and the first peripheral device and the central device directly performing a wireless connection correspondingly according to the service type information, the service address information, and the master/slave mode information.

In another aspect of the present disclosure, a step of the central device establishing a conventional Bluetooth connection between the central device and the peripheral device according to a service request after the networking, and establishing the Piconet correspondingly to allow any of two devices to be wirelessly connected according to the peripheral device service list, comprises:

a first peripheral device triggering the service request to transmit connection request signaling to the central device through the conventional Bluetooth, the central device transmitting connection response signaling to the first peripheral device through the conventional Bluetooth, the central device establishing a connection with the first peripheral device;

the first peripheral device transmits the service type information, the service address information, and master/slave mode information to the central device; and the first peripheral device and the central device directly performing a wireless connection correspondingly according to the service type information, the service address information, and the master/slave mode information.

An interconnection system of networking of a Piconet based on Bluetooth low power and conventional Bluetooth comprising:

an advertising and scanning module configured to allow that each of a plurality of peripheral devices uses a connectable undirected method to advertise service type information corresponding to the each of the plurality of peripheral devices and service address information to the surroundings under a low energy mode; a central device scans and obtains a Bluetooth address, the serve type information, and the service address information respectively corresponding to the each of the peripheral devices, the service type information is the service type information whether or not supported by a plurality of wireless connections, the service address information is the service address information corresponding to the plurality of wireless connections;

a networking module configured to allow that the central device generates a peripheral device service list correspondingly according to the Bluetooth address, the serve type information, and the service address information corresponding to the each of the peripheral devices so as to complete networking between the central device and the plurality of peripheral devices; and a wireless connection module configured to allow that the central device establishes a conventional Bluetooth connection between the central device and the peripheral devices according to a service request after networking, and establishes the Piconet correspondingly to allow any of two devices to be wirelessly connected according to the peripheral device service list.

In one aspect of the present disclosure, the advertising and scanning module comprises:

a first advertising unit configured to allow the each of the plurality of peripheral devices uses the connectable undirected method to periodically and dynamically advertise all the service type information and the service address information of the each of the plurality of peripheral devices to the surroundings by utilizing advertising packets under the low energy mode;

a first scan unit configured to allow the central device periodically scans the peripheral devices in a surrounding area, a scanning period being disposed to be the same as an advertising period of all the peripheral devices;

a first information acquisition unit configured to allow that the central device obtains the Bluetooth address, information of service types being supported, and the service address information corresponding to the each of the plurality of peripheral devices after one round of scanning.

In another aspect of the present disclosure, the advertising and scanning module comprises:

a second advertising unit configured to allow that the each of the plurality of peripheral devices uses the connectable undirected method to periodically and dynamically advertise information of service types being supported by the each of the plurality of peripheral devices and the service address information to the surroundings by utilizing advertising packets under the low energy mode;

a second scan unit configured to allow that the central device periodically scans the peripheral devices in a surrounding area, a scanning period being set as T, if a number of types of services supported by a specific peripheral device is x, then an advertising period of the specific peripheral device being $$\frac{256T}{2^{[\log_2 x]}},$$

at the same time, a standby time being $$256T - \frac{256T}{2^{[\log_2 x]}} x,$$

where $[\log_2 x]$ represents a smallest integer that is greater than or equal to $\log_2 x$;

a second information acquisition unit configured to allow that the central device obtains the Bluetooth address, the information of service types being supported, and the service address information corresponding to the each of the peripheral devices after one round of scanning.

The interconnection method and system of networking of the Piconet based on Bluetooth low energy and conventional Bluetooth according to the present disclosure effectively resolve the problem that the wireless interconnection between two smart terminals is inconvenient in the related art. Based on the Piconet of Bluetooth low energy, each of the plurality of peripheral devices uses a connectable undirected method to advertise the service type information whether or not supported by the plurality of wireless connections corresponding to the each of the plurality of peripheral devices and the service address information corresponding to the plurality of wireless connections to the surroundings under the low energy mode; the central device scans and obtains a Bluetooth address, the serve type information, and the service address information respectively corresponding to the each of the peripheral devices; the central device generates the peripheral device service list correspondingly according to the Bluetooth address, the serve type information, and the service address information respectively corresponding to the each of the peripheral devices so as to complete the networking between the central device and the plurality of peripheral devices; the central device establishes the conventional Bluetooth connection between the central device and the peripheral device according to the service request after the networking, and establishes the Piconet correspondingly to allow any of two devices to be wirelessly connected according to the peripheral device service list. Through establishing the Piconet, the wireless interconnection between any of the two devices including the central device and the peripheral devices can be realized. In the whole process, users operate simply. At the same time, the devices usually have an ultra-low standby power consumption. The networking of smart terminals can be automatically completed by using the function of Bluetooth low energy of the smart terminals, which is quick and convenient. When a user wants to perform a wireless connection between two smart terminals in the network, the user only needs to trigger the connection on any of the smart terminals through the function of conventional Bluetooth of the smart terminal. The interconnection is convenient to provide the user with much convenience.

DESCRIPTION OF SPECIFIC EMBODIMENTS OF THE INVENTION

The present disclosure proposes an interconnection method and system of networking of Piconet based on bluetooth low energy and conventional bluetooth. For the purpose of description rather than limitation, the following provides such specific details as a specific system structure, interface, and technology for a thorough understanding of the application. However, it is understandable by persons skilled in the art that the application can also be implemented in other embodiments not providing such specific details. In other cases, details of a well-known apparatus, circuit and method are omitted to avoid hindering the description of the application by unnecessary details.

A detailed description of Bluetooth low energy (BLE) protocol is first provided as follows.

As compared with conventional Bluetooth, advantages of Bluetooth low energy are power saving as well as small data transmission amount, thus being adaptable to networking between smart terminals. The development of BLE protocol is mainly on the link layer (LL), the generic access profile (GAP), and the generic attribute profile (GATT). They are respectively described as follows.

According to the BLE protocol released by the Bluetooth Alliance, the link layer defines signaling of a BLE channel and a role and a state of an advertising channel. A signaling format of the BLE channel is shown in Table 1, which is adaptable to an advertising channel and a data channel. For the BLE channel, preamble code Preamble and an access address Access Address are fixed data. Protocol data unit (PDU) of the signaling can carry information in the BLE channel. Cyclic redundancy check (CRC) is used for cyclic check.

TABLE 1

| Preamble | Access Address | PDU | CRC |
| --- | --- | --- | --- |
| 1 Byte | 4 Bytes | 2 to 39 Bytes | 3 Bytes |

Figure 7:
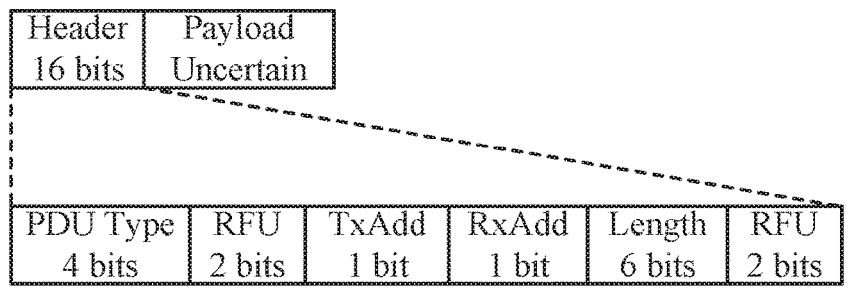
FIG. 7 illustrates a structure of a PDU of signaling of the advertising channel.

In greater detail, PDU of signaling of the advertising channel is constituted by a header Header and payload Payload, as shown in FIG. 7.

A 4-bit PDU type in the Header determines a signaling type of the advertising channel, such as connectable undirected advertising signaling (ADV_IND), connectable directed advertising signaling (ADV_DIRECT_IND), non-connectable undirected advertising signaling (ADV_NONCONN_IND), scan request signaling (SCAN_REQ), scan response signaling (SCAN_RSP), connection request signaling (CONNECT_REQ), scannable undirected advertising signaling (ADV_SCAN_IND), which are shown in Table 2. Table 2 shows signaling types of the advertising channel.

TABLE 2

| PDU Type | Packet Name |
| --- | --- |
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Figure 4:
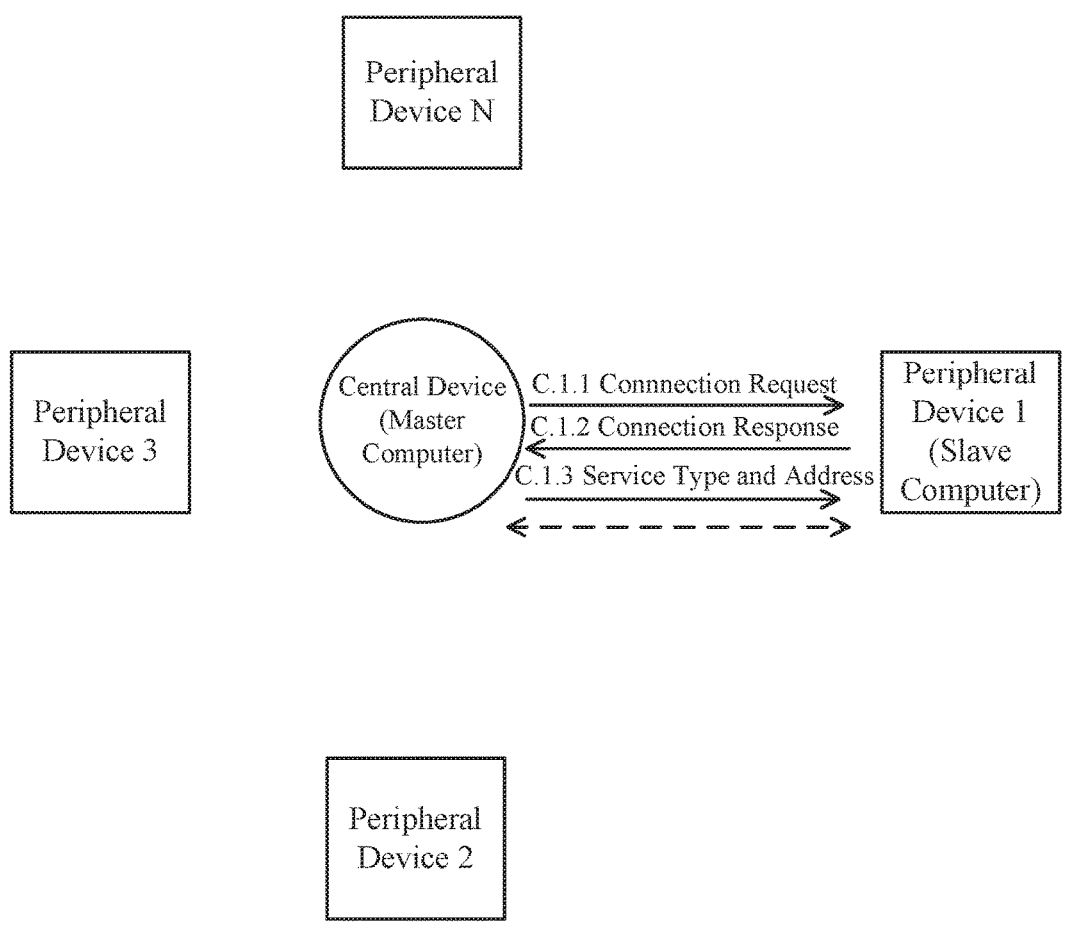
FIG. 4 is a schematic flowchart of an interconnection method of networking of a Piconet based on Bluetooth low energy and conventional Bluetooth according to a third embodiment of the present disclosure.

A format of Payload of the connectable undirected advertising signaling is shown in FIG. 4. AdvA indicates a Bluetooth address of an advertiser. AdvData represents an advertising packet that can carry information up to 31 bytes.

TABLE 3

| Payload | |
| --- | --- |
| AdvA | AdvData |
| 6 Bytes | 0-31 Bytes |

Figure 8:
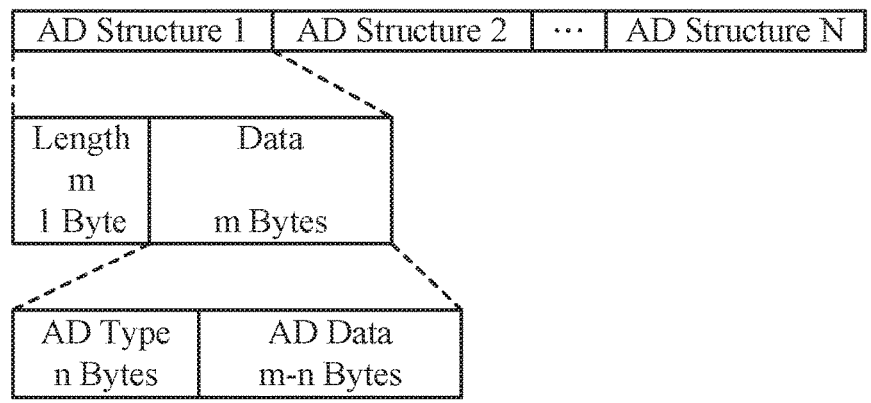
FIG. 8 illustrates a format of the advertising packet of the connectable undirected advertising signaling.

A format of the advertising packet of the connectable undirected advertising signaling is shown in FIG. 8. AD Structure represents an information segment. One advertising packet can accommodate a plurality of information segments. AD Type indicates a type of the information segment, such as a Bluetooth name, a Bluetooth manufacturer, UUID, etc. AD Data represents content of the information segment. A value of length represents a number of bytes of Data.

Text blocks of AD Type that have been defined by the Bluetooth Alliance are shown in Table 4, whereas those that have not been defined are reserved text blocks.

TABLE 4

| 0x01 | 0x02 | 0x03 | 0x04 | 0x05 | 0x06 | 0x07 | 0x08 |
|------|------|------|------|------|------|------|------|
| 0x09 | 0x0A | 0x0D | 0x0E | 0x0F | 0x10 | 0x11 | 0x12 |
| 0x14 | 0x1F | 0x15 | 0x16 | 0x20 | 0x21 | 0x17 | 0x18 |
| 0x19 | 0x1A | 0x1B | 0x1C | 0x1D | 0x1E | 0x3D | 0xFF |

The link layer defines three roles in the advertising channel: the advertiser, a scanner, and an initiator in a non-connected state. The link layer defines three states in the advertising channel: an advertising state, a scan state, and an initiating state.

The advertising state includes:

(1) Connectable undirected event: the advertiser advertises the ADV_IND signaling to all the scanners in a surrounding area, and announces that it is in a connectable mode. The advertiser monitors the SCAN_REQ signaling transmitted from the scanners, and transmits the SCAN_RSP signaling to the scanners. The advertiser also monitors the CONNECT_REQ signaling transmitted from the initiator.

(2) Connectable directed event: the advertiser advertises the ADV_DIRECT_IND signaling to specific scanners in the surrounding area, and announces that it is in the connectable mode. The advertiser only monitors the CONNECT_REQ signaling transmitted form a specific initiator.

(3) Non-connectable undirected event: the advertiser advertises the ADV_NONCONN_IND signaling to all the scanners in the surrounding area, and announces that it is in a non-connectable mode. The advertiser does not monitor signaling transmitted from the scanners.

(4) Scannable undirected event: the advertiser advertises the ADV_SCAN_IND signaling to all the scanners in the surrounding area. The advertiser only monitors the SCAN_REQ signaling transmitted from the scanners, and then transmits the SCAN_RSP signaling to the scanners.

The scan state includes:

(1) Passive scan: the scanner in a passive scan mode can only monitor signaling advertised by the advertiser but cannot transmit data to the external.

(2) Active scan: the scanner in an active scan mode monitors the signaling advertised by the advertiser, only transmits the SCAN_REQ signaling to the advertiser that advertises the ADV_IND signaling and the ADV_SCAN_IND signaling, and continues to monitor the SCAN_RSP signaling transmitted from the advertiser after the transmission is completed.

The initiating state includes:

(1) The initiator in the initiating state can transmit the CONNECT_REQ signaling to the advertiser that broadcasts the ADV_IND signaling and the ADV_DIRECT_IND signaling.

Signaling relationships corresponding to the three states of the advertising channel are shown in Table 5.

The GAP layer defines four roles: a broadcaster role, an observer role, a peripheral role, and a center role.

The broadcaster role: a device playing the broadcaster role advertises to the surroundings under a low energy mode but does not respond to connection requests from other devices, that is, the device playing the broadcaster role is in the non-connectable mode.

The observer role: a device playing the observer role can scan the device playing the broadcaster role but cannot initiate the connection request, that is, the device playing the observer role is in the non-connectable mode.

The peripheral role: a device playing the peripheral role advertises to the surroundings under the low energy mode and responds to the connection requests from other devices, that is, the device playing the peripheral role is in the connectable mode.

The center role: a device playing the center role can scan the device playing the peripheral role and can initiate the connection request, that is, the device playing the center role is in the connectable mode.

Corresponding relationships between the LL layer and the GAP layer are shown in Table 6.

TABLE 6

| Link Layer functionality | Broadcaster | Observer | Peripheral | Central |
|---|---|---|---|---|
| Advertising event types: | | | | |
| Connectable undirected event | E | E | M | E |
| Connectable directed event | E | E | O | E |
| Non-connectable undirected event | M | E | O | E |
| Scannable undirected event | O | E | O | E |
| Scanning types: | | | | |
| Passive scanning | E | M | E | O |
| Active scanning | E | O | E | O/E |

In Table 6, "E" indicates "not support". "M" indicates "need to support". "O" indicates "optionally support". "O/E" indicates that if the center role supports the passive scan, then the center role optionally supports the active scan, or the center role needs to support the active scan. The present disclosure defines two physical device types, i.e. a central device and a peripheral device. The central device: located at a center position of a network and at the same time has functions of Bluetooth low energy and conventional Bluetooth; the peripheral device: located at a peripheral position of the network and at the same time has the functions of Bluetooth low energy and conventional Bluetooth.

When the peripheral device plays the peripheral role, the peripheral device uses a connectable undirected method to advertise the ADV_IND signaling to the surroundings under the low energy mode, the central device can obtain a

TABLE 5

| | | Response PDU for advertising event | |
|---|---|---|---|
| Advertising event | PBU in advertising event | SCAN_REQ | CONNECT_REQ |
| Connectable undirected event | ADV_IND | YES | YES |
| Connectable directed event | ADV_DIRECT_IND | NO | YES |
| Non-connectable undirected event | ADV_NONCONN_IND | NO | NO |
| Scannable undirected event | ADV_SCAN_IND | YES | NO |

Figure 9:
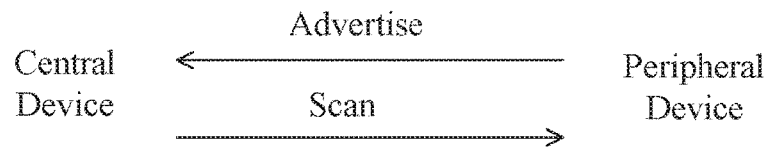
FIG. 9 illustrates a connectable undirected advertising and passive scanning mechanism of the GAP layer.

Bluetooth address and an advertising packet of the peripheral device through passive scanning, as shown in FIG. 9. FIG. 9 illustrates a connectable undirected advertising and passive scanning mechanism of the GAP layer.

A general description of the conventional Bluetooth protocol is first provided as follows.

Advantages of the conventional Bluetooth are large data transmission amount as well as higher data transmission speed, thus being adaptable to interconnections between smart terminals. The development of the conventional Bluetooth protocol is mainly in the logical link control and adaptation protocol (L2CAP) and the generic access profile (GAP). They are respectively described as follows.

According to the conventional Bluetooth protocol released by the Bluetooth Alliance, the logical link control and adaptation protocol defines a command format and a data format. Two Bluetooth devices need to exchange a series of commands during a communication process. A general signaling format of a command channel is shown in Table 7.

TABLE 7

| | | Commands | | | |
|---|---|---|---|---|---|
| Length | Channel ID | Code | Identifier | Length | Data |
| m + 4 | 0001 | | | m | |
| 2 Bytes | 2 Bytes | 1 Byte | 1 Byte | 2 Bytes | m Bytes |

Length represents a number of bytes of Commands. Channel ID is fixed to 0x0001. Code in Commands indicates a command type, such as a connection request or a connection response. Table 8 shows command code definitions. As shown in Table 8, Identifier in Commands is used for matching the request and response. Length in Commands represents a number of bytes of Data in Commands. Data in Commands represents information portable by the command.

TABLE 8

| Code | Description |
|---|---|
| 0x00 | RESERVED |
| 0x01 | Command reject |
| 0x02 | Connection request |
| 0x03 | Connection response |
| 0x04 | Configure request |
| 0x05 | Configure response |
| 0x06 | Disconnection request |
| 0x07 | Disconnection response |
| 0x08 | Echo request |
| 0x09 | Echo response |
| 0x0A | Information request |
| 0x0B | Information response |

A format of Commands of the connection request is shown in Table 9. PSM represents protocol/service multiplexing, which is divided into two parts. The first part is regularly allocated by the Bluetooth Alliance and used for protocol, the second part is dynamically allocated by a system and used for service. PSM occupies a length of at least 2 bytes. Source CID represents a channel ID of a Bluetooth device that transmits the connection request.

TABLE 9

| | | | Data | |
|---|---|---|---|---|
| Code | Identifier | Length | PSM | Source CID |
| 02 | | m + 2 | | |
| 1 Byte | 1 Byte | 2 Bytes | m(≥2) Bytes | 2 Bytes |

A format of Commands of a connection response is shown in Table 10.

TABLE 10

| | | | Data | | | |
|---|---|---|---|---|---|---|
| Code | Identifier | Length | Destination CID | Source CID | Result | Status |
| 03 | 1 Byte | 8 | 2 Bytes | 2 Bytes | 2 Bytes | 2 Bytes |
| 1 Byte | | 2 Bytes | | | | |

Destination CID represents a channel ID of a Bluetooth device that transmits the connection response. Source CID represents a channel ID of the Bluetooth device that receives the connection response, which is directly copied from the Source CID of the connection request. Result represents a result of a connection request signaling, such as "Connection successful", "Connection pending", or "Connection refused", etc., as shown in Table 11. Table 11 shows resulting values of the connection request signaling.

TABLE 11

| Value | Description |
|---|---|
| 0x0000 | Connection successful |
| 0x0001 | Connection pending |
| 0x0002 | Connection refused - PSM not supported |
| 0x0003 | Connection refused - security block |
| 0x0004 | Connection refused - no resources available |
| Other | Reserved |

For the situation that the connection request result is "Connection pending", a state "Status" is used for further illustrating the reason why the result is "Connection pending", as shown in Table 12. Table 12 shows values of Status.

TABLE 12

| Value | Description |
|---|---|
| 0x0000 | No further information available |
| 0x0001 | Authentication pending |
| 0x0002 | Authorization pending |
| Other | Reserved |

After the two Bluetooth devices have established a connection, a packet transmit format is shown in Table 13. Table 13 shows the packet transmit format of the two Bluetooth devices. Length represents a number of bytes of Information payload. Channel ID represents an ID of a destination channel, which is dynamically allocated by the system. Information payload represents content of the packet, a length of Information payload may be disposed from 0 to 65535 bytes.

TABLE 13

| Length | Channel ID | Information payload |
|---|---|---|
| m<br>2 Bytes | 2 Bytes | m Bytes |

When two or more than two Bluetooth devices have successfully connected to form a Piconet, a packet format transmitted by a master computer is shown in Table 14. Length represents a total number of bytes of PSM and Information payload. Channel ID is fixed to 0x0002. PSM represents protocol/service multiplexing, which is divided into two parts. The first part is regularly allocated by the Bluetooth Alliance and used for protocol, the second part is dynamically allocated by the system and used for service. PSM occupies a length of at least 2 bytes. Information payload represents content of the packet, a length of Information payload may be disposed from 0 to 65535 bytes. A packet format transmitted by a slave computer in the Piconet is the same as that shown in Table 13.

TABLE 14

| Length | Channel ID | PSM | Information payload |
|---|---|---|---|
| m + n<br>2 Bytes | 0002<br>2 Bytes | m(≥2) Bytes | n Bytes |

The Generic Access Profile defines actions and states, such as "inquire", "discoverable", "connecting", "connectable", and "connected".

Inquire and discoverable: a Bluetooth device can simultaneously inquire of Bluetooth devices nearby and be discovered by the Bluetooth devices nearby through time-division multiplexing. That is, a conventional Bluetooth device can serve as an inquiring device and a discoverable device simultaneously. The inquiring device obtains Bluetooth addresses of discoverable devices through inquiry. The inquiring device and the discoverable device may have already been connected to another Bluetooth device, but still maintain the functions of inquiring and being discoverable.

Figure 10:
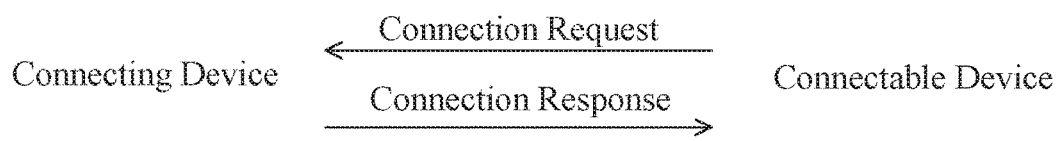
FIG. 10 shows signaling exchange between the connecting device and the connectable device.

Connecting and connectable: a Bluetooth device can simultaneously connect Bluetooth devices nearby and be connected by the Bluetooth devices nearby through time-division multiplexing. That is, a Bluetooth device can serve as a connecting device and a connectable device simultaneously. The connecting device transmits connection request signaling to the connectable device. The connectable device transmits connection response signaling to the connecting device, as shown in FIG. 10. FIG. 10 shows signaling exchange between the connecting device and the connectable device. After the connection is successful, the Bluetooth device that initiates the connection is the master computer in the network, the Bluetooth device that is connected is the slave computer in the network.

The connecting device and the connectable device may have already been connected to another Bluetooth device, but still maintain the connecting and connectable functions.

Connected state: Two Bluetooth devices can transmit alphabetic string messages to each other after the two Bluetooth devices have been successfully connected. The two Bluetooth devices have the functions of inquiring, being discoverable, connecting, being connectable when being kept connected.

In consideration of network topology, a plurality of Bluetooth devices can constitute a network through connections, such as a Piconet, that is, a Piconet in which one Bluetooth device serves as a master computer and another Bluetooth device serves as a slave computer. In the Piconet, the master computer can simultaneously transmit alphabetic string messages to all slave computers in the network, and all the slave computers can transmit alphabetic string messages to the master computer individually.

Figure 1:
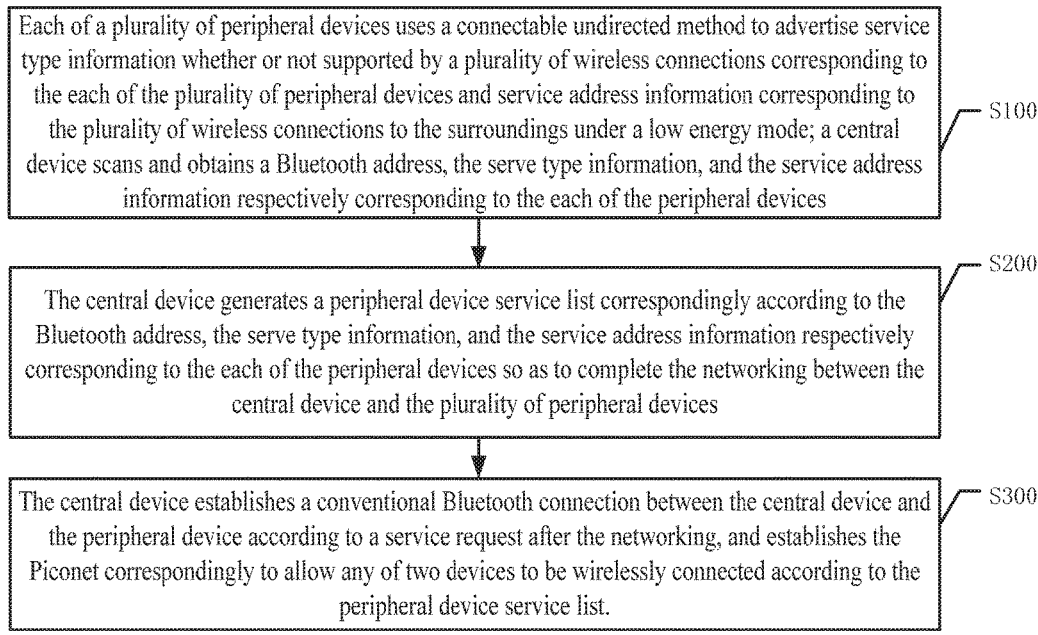
FIG. 1 is a flowchart of an interconnection method of networking of a Piconet based on Bluetooth low energy and conventional Bluetooth according to one preferred embodiment of the present disclosure.

Refer to FIG. 1, FIG. 1 is a flowchart of an interconnection method of networking of a Piconet based on Bluetooth low energy and conventional Bluetooth according to one preferred embodiment of the present disclosure. As shown in FIG. 1, the method includes the following steps:

Step S110: each of a plurality of peripheral devices uses a connectable undirected method to advertise service type information whether or not supported by a plurality of wireless connections corresponding to the each of the plurality of peripheral devices and service address information corresponding to the plurality of wireless connections to the surroundings under the low energy mode; a central device scans and obtains a Bluetooth address, the serve type information, and the service address information respectively corresponding to the each of the peripheral devices;

Step S200: the central device generates a peripheral device service list correspondingly according to the Bluetooth address, the serve type information, and the service address information corresponding to the each of the peripheral devices so as to complete networking between the central device and the plurality of peripheral devices;

Step S300: the central device establishes a conventional Bluetooth connection between the central device and the peripheral device according to a service request after networking, and establishes the Piconet correspondingly to allow any of two devices to be wirelessly connected according to the peripheral device service list.

In the following, a detailed description of the above steps is provided with reference to the embodiments.

In step S100, the each of the plurality of peripheral devices uses the connectable undirected method to advertise the service type information whether or not supported by the plurality of wireless connections corresponding to the each of the plurality of peripheral devices and the service address information corresponding to the plurality of wireless connections to the surroundings under the low energy mode; the central device scans and obtains the Bluetooth address, the serve type information, and the service address information respectively corresponding to the each of the peripheral devices. In greater detail, the peripheral devices and the central device refer to various smart terminals, such as smart TVs, wireless stereo systems, smartphones, tablets, notebooks, computers, wireless routers, wireless cameras, wireless projectors, smart lighting, smart refrigerators, smart water heaters, smart printers, etc. These smart terminals usually have the Bluetooth function.

In greater detail, the each of the peripheral devices uses the "connectable undirected" method to advertise the service types whether or not supported by the wireless connections corresponding to it and the service addresses, as shown in Table 15 (all the central device and the peripheral devices have the service tables).

TABLE 15

| Service type | Whether to support | Service address |
|---|---|---|
| 0:WiFi | 1111111 | Add 0 |
| 1:NFC | 0000000 | Null |
| . . . | . . . | . . . |
| 255:GNSS | 1111111 | Add 255 |

The central device passively scans the peripheral devices in a surrounding area to obtain the Bluetooth address, the service types being supported, and the service addresses of all the peripheral devices so as to constitute the peripheral device serve list, as shown in Table 16. The networking is thus completed.

TABLE 16

| Number of Peripheral device | Bluetooth address | Service type | Whether to support | Service address |
|---|---|---|---|---|
| 1 | | 0:WiFi | 1111111 | Add 0 |
| | | 1:NFC | 0000000 | Null |
| | | ... | ... | ... |
| | | 255:GNSS | 1111111 | Add 255 |
| 2 | | | | |
| ... | | | | |
| N | | | | |

In practical applications, a modified point of connectable undirected advertising signaling is specifically: the peripheral device uses the "connectable undirected" method to periodically and dynamically advertise the service types supported by it and the service addresses to the surroundings by utilizing advertising packets under the low energy mode. The self-defined advertising packet is shown in Table 17.

TABLE 17

| | | | Data | | |
|---|---|---|---|---|---|
| Length | AD Type | Service Type | Service Support | Service Address | Zeros |
| m + 3 | 22 | | | | 000 ... 000 |
| 1 Byte | 1 Byte | 1 Byte | 1 Byte | m Bytes | 27 − m Bytes |

A value of Length represents a total number of bytes of AD type, and Service Type, Service Support, as well as Service Address in Data. A value of AD type is "22". This value has not been defined by the Bluetooth Alliance. In order to avoid that other BLE devices are interfered with, the text blocks of AD Type that have been defined by the Bluetooth Alliance is shown are Table 4. Service Type in Data indicates the service type, which can indicate up to 256 types of services. Service Support indicates whether or not the peripheral device supports the service. "11111111" is utilized to indicate supporting, and "00000000" is utilized to indicate not supporting. Service Address indicates an address of service being supported. If the service is not supported, a value of Service Address is "00000000". The rest of the byte(s) of the advertising packet is zeroized.

Preferably, in practical applications, two types of periodical advertising modes can be selected. In other words, step S110 can be implemented by two methods. In the first implementation method, step S100 includes:

S111: the each of the plurality of peripheral devices uses the connectable undirected method to periodically and dynamically advertise all the service type information and service address information of the each of the plurality of peripheral devices to the surroundings by utilizing the advertising packets under the low energy mode;

S112: the central device periodically scans the peripheral devices in the surrounding area, a scanning period is disposed to be the same as an advertising period of all the peripheral devices;

S113: the central device obtains the Bluetooth address, the information of service types being supported, and the service address information corresponding to the each of the plurality of peripheral devices after one round of scanning.

In greater detail, the peripheral devices periodically advertise all the 256 service types and service addresses (the services addresses of the service types not being supported are represented by "00000000"). The central device periodically scans the peripheral devices in the surrounding area, the scanning period is disposed to be the same as the advertising period of all the peripheral devices. After one round that is 256 scanning periods, the central device can obtain the Bluetooth address, the service types being supported, and the service addresses corresponding to the each of the plurality of peripheral devices, as shown in Table 16. The networking is thus completed.

In the second implementation method, step S100 specifically includes:

S121: the each of the plurality of peripheral devices uses the connectable undirected method to periodically and dynamically advertise the information of service types supported by the each of the plurality of peripheral devices and the service address information to the surroundings by utilizing the advertising packets under the low energy mode;

S122: the central device periodically scans the peripheral devices in the surrounding area. A scanning period is set as T. If a number of types of the services supported by a specific peripheral device is x, then an advertising period of the specific peripheral device is $$\frac{256T}{2^{[\log_2 x]}}.$$

At the same time, a standby time is $$256T - \frac{256T}{2^{[\log_2 x]}} x,$$

where $[\log_2 x]$ represents a smallest integer that is greater than or equal to $\log_2 x$.

S123: the central device obtains the Bluetooth address, the information of service types being supported, and the service address information corresponding to the each of the plurality of peripheral devices after one round of scanning.

In greater detail, each of the peripheral devices periodically advertises the service types being supported and the service addresses but does not advertise the service types not being supported and the service addresses. The central device periodically scans the peripheral devices in the surrounding area. For example, the peripheral devices in green only support one type of service, which advertise every 256 scanning periods. The peripheral devices in red supports 256 types of services, which advertise every scanning period.

Generally speaking, the scanning period is set as T and the number of types of the services supported by the peripheral device is x, then the advertising period of the peripheral device is $$\frac{256T}{2^{[\log_2 x]}}$$

and at the same time the standby time is $$256T - \frac{256T}{2^{[\log_2 x]}} x,$$

where [log₂ x] represents the smallest integer that is greater than or equal to log₂x. That is, the advertising period and the standby time of the peripheral device differ depending on the different types of services being supported, as shown in Table 18. Table 18 shows corresponding relations between the different types of services and the advertising period and the standby time of the peripheral device.

TABLE 18

| Types of services supported | Advertising period | Standby time |
|---|---|---|
| 1 | 256T | 0 |
| 2 | 128T | 0 |
| 3 | 64T | 64T |
| ... | ... | ... |
| 256 | 1T | 0 |

After one round that is 256 scanning periods, the central device can obtain a list of the Bluetooth address, the types of services being supported, and the service addresses corresponding to the each of the plurality of peripheral devices, as shown in Table 16. The networking is thus completed. Each of the first implementation method and the second implementation method has its own advantage. The first implementation method disposes the advertisers in a unified manner, thus easier to achieve. The second implementation method disposes the different advertising periods depending on the types of services being supported by the advertisers, thus saving power.

In step S200, the central device generates the peripheral device service list correspondingly according to the Bluetooth address, the serve type information, and the service address information corresponding to the each of the peripheral devices so as to complete the networking between the central device and the plurality of peripheral devices.

In step S300, the central device establishes the conventional Bluetooth connection between the central device and the peripheral device according to the service request after the networking, and establishes the corresponding Piconet to allow any of the two devices to be wirelessly connected according to the peripheral device service list. In greater detail, after the networking between the central device and the peripheral device has been completed, the central device obtains the peripheral device service list (Table 16). The central device and the peripheral device also maintain the function of the conventional Bluetooth when maintaining the function of Bluetooth low energy, and the interconnection process is achieved by relying on the conventional Bluetooth.

Only when the central device actively triggers a service or receives a service trigger request of the peripheral device do the central device and the peripheral device establish the conventional Bluetooth connection. The Piconet is thus constituted to notify the service type, the service addresses, and the master/slave mode(s) of a wireless connection. The interconnection process can be divided into four scenarios, which are respectively described as follows.

Through the interconnection method of networking of the Piconet based on the Bluetooth low energy and conventional Bluetooth according to the present disclosure, the wireless interconnection, such as WiFi or NFC, between any of the two devices can be realized by using the service type, the service addresses, and the master/slave mode(s) of the wireless connection correspondingly. The wireless connection service can thus be performed conveniently. For example, if device A wants to have a WiFi connection with Device B, the two devices only need to establish the Piconet correspondingly through the central device, then the device A and the device B respectively transmit their Bluetooth addresses through the conventional Bluetooth to realize the WiFi connection correspondingly according to realize the WiFi connection correspondingly according to the WiFi service type, the master/slave mode(s), and the WiFi service address corresponding to the WiFi of the other party. Both the device A and the device B may be the peripheral devices. Or, one of them may be the central device. In this manner, users are provided with much convenience in operations. The operations are simple, thus easy to control/manage and trigger the wireless connection service between the smart terminals. At the same time, the smart terminals have lower standby power consumption.

In practical applications, the interconnection between any of the two devices can be divided into four scenarios, which are respectively described as follows.

Figure 2:
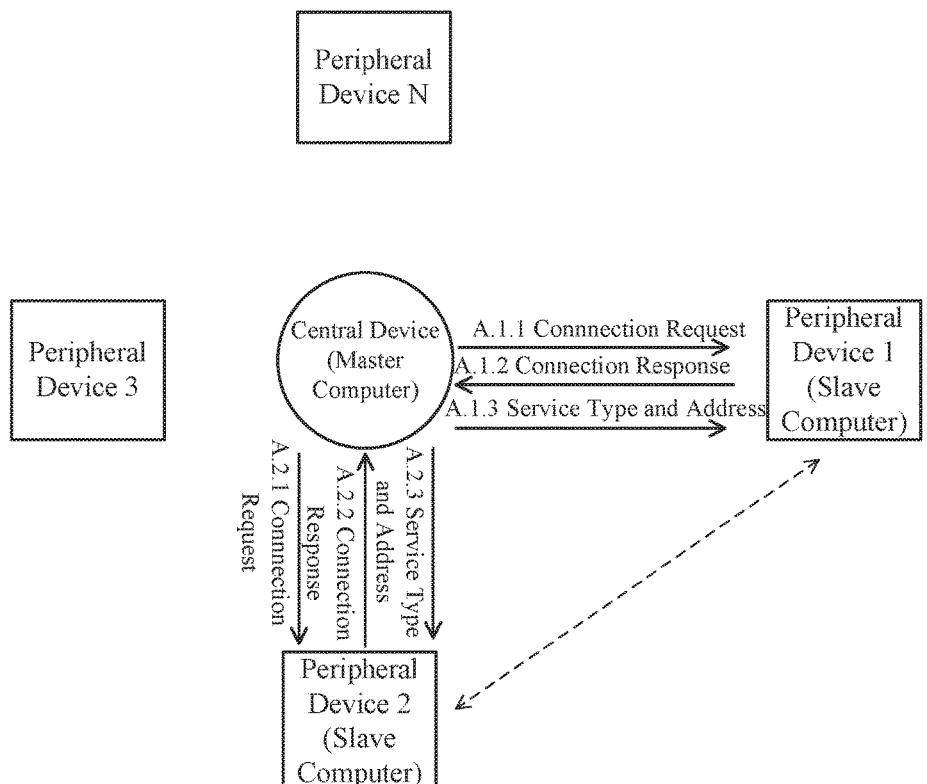
FIG. 2 is a schematic flowchart of an interconnection method of networking of a Piconet based on Bluetooth low energy and conventional Bluetooth according to a first embodiment of the present disclosure.

Refer to FIG. 2, FIG. 2 is a schematic flowchart of an interconnection method of networking of a Piconet based on Bluetooth low energy and conventional Bluetooth according to a first embodiment of the present disclosure. The central device actively triggers the service request to transmit a service type and service addresses to two peripheral devices after the networking. The two peripheral devices realize an interconnection after receiving messages. A peripheral device 1 represents a first peripheral device referred to hereinafter. A peripheral device 2 represents a second peripheral device referred to hereinafter.

In greater detail, step S300 includes:

S311: the central device triggers the service request to transmit connection request signaling to a first peripheral device through the conventional Bluetooth. The first peripheral device transmits connection response signaling to the central device through the conventional Bluetooth. The central device establishes a connection with the first peripheral device to constitute the corresponding Piconet;

S312: the central device transmits connection request signaling to a second peripheral device through the conventional Bluetooth when being kept connected to the first peripheral device by using time-division multiplexing. The second peripheral device transmits connection response signaling to the central device through the conventional Bluetooth. The central device establishes a connection with the second peripheral device to add the second peripheral device to the Piconet;

S313: the central device transmits the service type information, the service address information, and master/slave mode information to the first peripheral device and the second peripheral device through the Piconet;

S314: the first peripheral device and the second peripheral device directly perform a wireless interconnection correspondingly according to the service type information, the service address information, and the master/slave mode information transmitted by the central device.

In greater detail, all the central device and peripheral devices maintain the function of conventional Bluetooth after the networking. When the central device actively triggers the service, it first transmits "connection request" signaling to the first peripheral device (the peripheral device 1), then this peripheral device transmits "connection response" signaling to the central device. The central device and the first peripheral device establishes the connection to constitute the Piconet. The central device becomes a master computer, and the peripheral devices become slave computers. After that, the central device transmits "connection request" signaling to the second peripheral device (the peripheral device 2) when being kept connected to the first peripheral device by using time-division multiplexing. Similarly, the second peripheral device transmits "connection response" signaling to the central device. The central device and the second peripheral device establish the connection. As for "connection request" signaling and "connection response" signaling, part of the description of the conventional Bluetooth may be referred to.

Under the Piconet mode, the central device becomes the master computer, and the two peripheral devices become the slave computers. The central device can simultaneously transmit alphabetic string messages, including data of the service type, a service object address, and the master/slave mode, to the two peripheral devices.

In a conventional Bluetooth L2CAP layer, Information Payload in the packet transmitted by the master computer in the Piconet shown in Table 14 is self-defined as that shown in Table 19. Table 19 shows a self-defined format of Information Payload in a Piconet packet.

TABLE 19

| Information Payload m + 1 Bytes | | | |
|---|---|---|---|
| Length | Type | Object Address | Mode |
| m 1 Byte | 1 Byte | m − 2 Bytes | 1 Byte |

A value of Length represents a total number of bytes of the service type (Type), the service object address (Object Address), and a mode (Mode). The mode is configured to select the master computer or the slave computer for performing the wireless connection service. "11111111" represents the master computer, and "00000000" represents the slave computer. After the two peripheral devices receive the messages transmitted from the central device, the two peripheral devices perform interconnection according to the service type, the service object addresses, and the master/slave mode.

In this manner, the central device transmits the service type information and the master/slave mode information to the first peripheral device and the second peripheral device in the Piconet through establishing the corresponding Piconet, and transmits the service address information corresponding to the first peripheral device to the second peripheral device and transmits the service address information corresponding to the second peripheral device to the first peripheral device. As a result, the first peripheral device and the second peripheral device can perform the wireless interconnection according to the service type, the service object addresses, and the master/slave mode.

Figure 3:
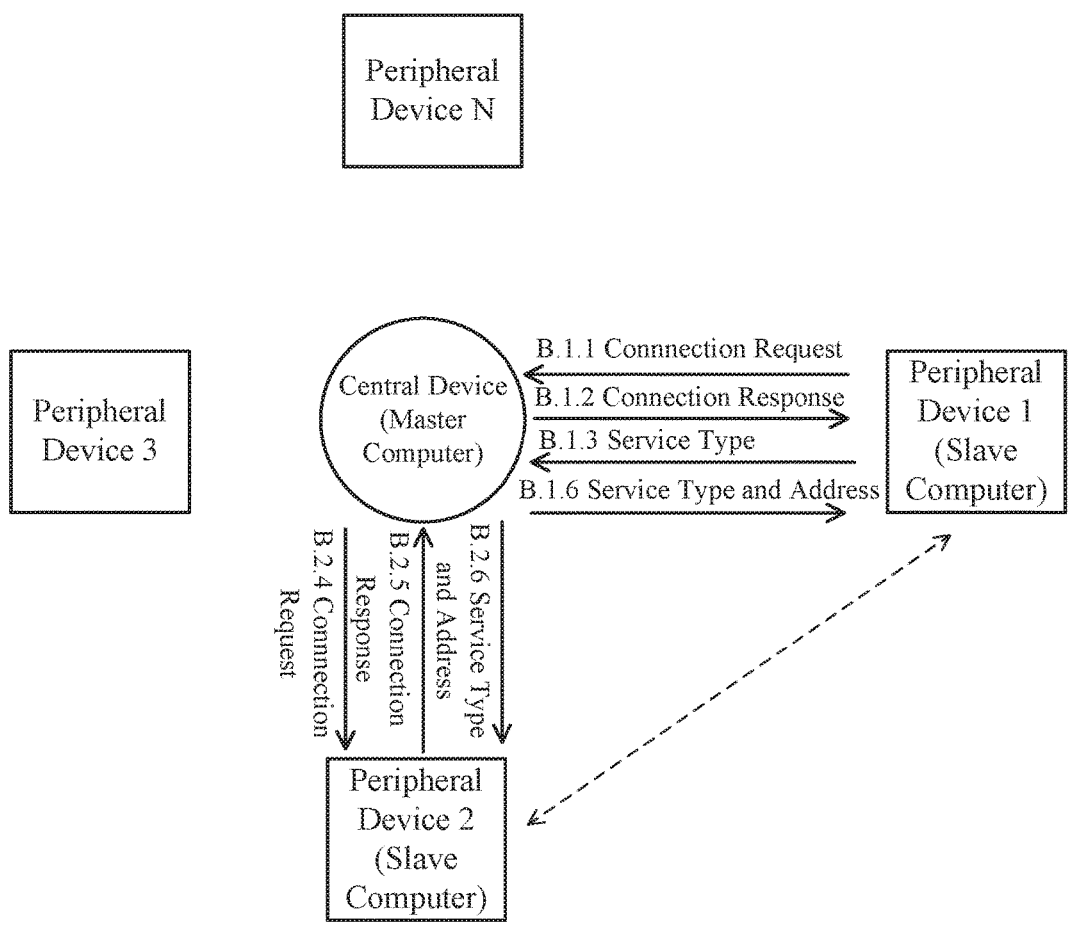
FIG. 3 is a schematic flowchart of an interconnection method of networking of a Piconet based on Bluetooth low energy and conventional Bluetooth according to a second embodiment of the present disclosure.

Refer to FIG. 3, FIG. 3 is a schematic flowchart of an interconnection method of networking of a Piconet based on Bluetooth low energy and conventional Bluetooth according to a second embodiment of the present disclosure. The peripheral device actively triggers the service request and transmits a service type to the central device. The central device finds another peripheral device having the same service type in the peripheral device service list according to the service type after receiving a message, and then respectively transmits the service type and service addresses to the two peripheral devices. The two peripheral devices thus realize interconnection after receiving the messages. The peripheral device 1 represents the first peripheral device referred to hereinafter. The peripheral device 2 represents the second peripheral device referred to hereinafter.

In greater detail, step S300 includes:

S321: when a first peripheral device actively triggers the service request to the central device, the first peripheral device transmits connection request signaling to the central device through the conventional Bluetooth, the central device transmits connection response signaling to the first peripheral device, the central device and the first peripheral device establishes a connection;

S322: the first peripheral device transmits the service type information correspondingly to the central device;

S322: the central device looks up a second peripheral device that supports same service type information as the first peripheral device from the peripheral device service list;

S323: the central device transmits connection request signaling to the second peripheral device through the conventional Bluetooth, the second peripheral device transmits connection response signaling to the central device, the central device and the second peripheral device establishes a connection to constitute the corresponding Piconet;

S324: the central device transmits the service type information, the service address information, and master/slave mode information to the first peripheral device and the second peripheral device through the Piconet. The first peripheral device and the second peripheral device directly perform a wireless interconnection correspondingly according to the service type information, the service address information, and the master/slave mode information transmitted by the central device.

The central device and peripheral devices maintain the function of conventional Bluetooth after the networking. When the peripheral device has a service trigger request, it transmits "connection request" signaling to the central device first, the central device transmits "connection response" signaling to the peripheral device. After the central device and the peripheral device are successfully connected, the peripheral device transmits an alphabetic string message of the service type. Information Payload in the packet transmitted by a slave computer in the Piconet shown in Table 13 is self-defined as that shown in Table 19, wherein Object Address and Mode do not need to be disposed and are represented by "00000000".

After the central device receives the above message and finds the another peripheral device that supports the same service type from the peripheral device service list according to the service type (if there are a plurality of peripheral devices that support the same service type, then select the peripheral device that is the first one to satisfy the condition in the peripheral device service list), the central device transmits "connection request" signaling to the another peripheral device. The another peripheral device transmits "connection response" signaling to the central device.

In this manner, the central device and the two peripheral devices constitute the Piconet. The central device becomes a master computer. The two peripheral devices become the slave computers. The central device can simultaneously transmit alphabetic string messages, which includes data of the service type, the service object addresses, and the master/slave mode, to the two peripheral devices.

The central device transmits the alphabetic string messages shown in Table 19 to the two peripheral devices. After the two peripheral devices receive the messages transmitted from the central device, the two peripheral devices perform interconnection according to the service type, the service object addresses, and the master/slave mode. The two peripheral devices, after receiving signaling transmitted from the central device, perform a wireless connection service according to the service type, the service object addresses, and the master/slave mode, such as using WiFi or NFC.

Refer to FIG. 4, FIG. 4 is a schematic flowchart of an interconnection method of networking of a Piconet based on Bluetooth low energy and conventional Bluetooth according to a third embodiment of the present disclosure. The central device actively triggers the service request to transmit a service type and a service address to the peripheral device. After the peripheral device receives a message, the interconnection between the central device and the peripheral device is realized. In greater detail, step S300 includes:

S331: the central device triggers the service request to transmit connection request signaling to a first peripheral device through the conventional Bluetooth. The first peripheral device transmits connection response signaling to the central device through the conventional Bluetooth. The central device establishes a connection with the first peripheral device.

S332: the central device transmits the service type information, the service address information, and master/slave mode information to the first peripheral device;

S333: the first peripheral device and the central device directly perform a wireless connection correspondingly according to the service type information, the service address information, and the master/slave mode information.

In greater detail, the central device and the first peripheral device maintain the function of conventional Bluetooth after the networking. When the central device has a service trigger request, it transmits "connection request" signaling to a designated peripheral device, the peripheral device transmits "connection response" signaling to the central device. After the central device and the peripheral device are successfully connected, the central device transmits an alphabetic string message, which includes data of the service type, a service object address, and a master/slave mode, to the peripheral device, as shown in Table 19. Content of Object Address is changed to a service address of the central device. At the same time, the central device also knows data of the service type (same as that being transmitted), a service object address (that is, a service address of the peripheral device), and a master/slave mode (opposite to that being transmitted). After the peripheral device receives the message transmitted by the central device, the central device and the peripheral device perform interconnection according to the service type, the service object addresses, and the master/slave mode. In this manner, the central device actively triggers the service to transmit the service type and the service address to the first peripheral device. The interconnection between the central device and the first peripheral device is realized after the first peripheral device receives the message.

Figure 5:
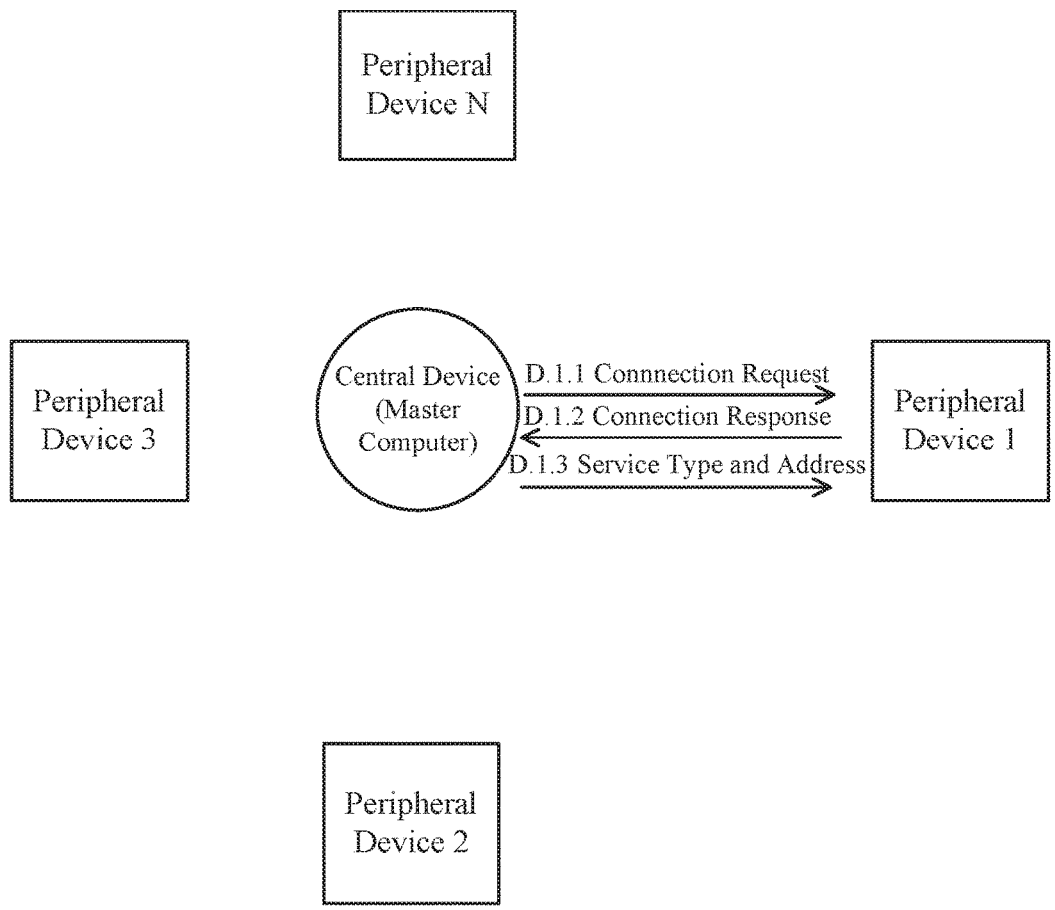
FIG. 5 is a schematic flowchart of an interconnection method of networking of a Piconet based on Bluetooth low energy and conventional Bluetooth according to a fourth embodiment of the present disclosure.

Refer to FIG. 5, FIG. 5 is a schematic flowchart of an interconnection method of networking of a Piconet based on Bluetooth low energy and conventional Bluetooth according to a fourth embodiment of the present disclosure. The peripheral device actively triggers the service request to transmit a service type and a service address to the central device. After the central device receives a message, the interconnection between the central device and the peripheral device is realized. In greater detail, step S300 specifically includes:

S341: the first peripheral device triggers the service request to transmit connection request signaling to the central device through the conventional Bluetooth. The central device transmits connection response signaling to the first peripheral device through the conventional Bluetooth. The central device establishes a connection with the first peripheral device.

S342: the first peripheral device transmits the service type information, the service address information, and master/slave mode information to the central device;

S343: the first peripheral device and the central device directly perform a wireless connection correspondingly according to the service type information, the service address information, and the master/slave mode information.

In greater detail, the central device and the first peripheral device maintain the function of conventional Bluetooth after the networking. When the peripheral device has a service trigger request, it transmits "connection request" signaling to the central device, the central device transmits "connection response" signaling to the peripheral device to allow the central device and the peripheral device to establish a connection. After the connection is successful, the peripheral device transmits an alphabetic string message, which includes data of the service type, a service object address, and a master/slave mode, to the central device, as shown in Table 23. Content of Object Address is changed to a service address of the peripheral device. At the same time, the central device also knows data of the service type (same as that being transmitted), a service object address (that is, a service address of the central device), and a master/slave mode (opposite to that being transmitted). After the central device receives the signaling transmitted by the peripheral device, the central device and the first peripheral device perform interconnection according to the service type, the service object addresses, and the master/slave mode.

According to the present disclosure, the Bluetooth low energy and the conventional Bluetooth are used as wireless communication methods. In the method of Bluetooth low energy, the peripheral device dynamically advertises signaling to transmit the Bluetooth address, the service types whether or not supported by the wireless connections corresponding to it, and the service addresses of the peripheral device, to the central device. The central device obtains a list including the Bluetooth addresses, the service types being supported, and the service addresses of the peripheral devices, through scanning. The automatic networking is thus completed. After that, in the method of the conventional Bluetooth, the central device and the peripheral device establishes the Piconet after the central device actively triggers the service request or receives the service trigger request of the peripheral device to notify the service type, the service addresses, and the master/slave mode(s) of the wireless connection. The interconnection is realized and the wireless connection service is activated in four application scenarios. The interconnection is convenient. In the whole process, users operate simply. At the same time, the smart terminals usually have an ultra-low standby power consumption, and the duration of interconnection process is shorter that will not cause a higher power consumption. Through establishing the Piconet, the interconnection between any of the two devices including the central device and the peripheral devices can be realized, thus easy to operate.

Figure 6:
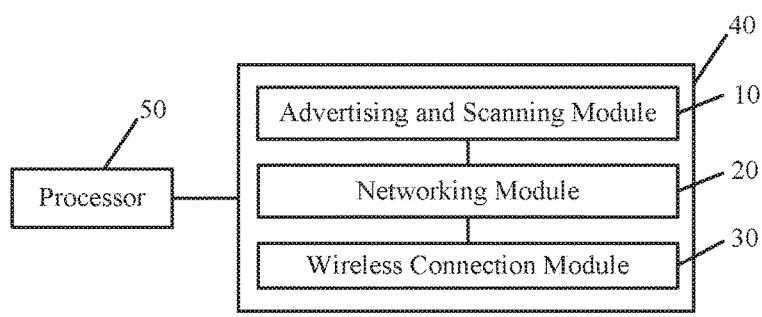
FIG. 6 is a structural block diagram of an interconnection system of networking of a Piconet based on Bluetooth low energy and conventional Bluetooth according to one preferred embodiment of the present disclosure.

Based on the above interconnection methods of networking of the Piconets based on Bluetooth low energy and conventional Bluetooth, the embodiment of the present disclosure further provides an interconnection system of networking of a Piconet based on Bluetooth low energy and conventional Bluetooth. As shown in FIG. 6, the system comprises:

an advertising and scanning module 10 configured to allow that each of a plurality of peripheral devices uses a connectable undirected method to advertise service type information whether or not supported by a plurality of wireless connections corresponding to the each of the plurality of peripheral devices and service address information corresponding to the plurality of wireless connections to the surroundings under a low energy mode; a central device scans and obtains a Bluetooth address, the serve type information, and the service address information respectively corresponding to the each of the peripheral devices, a detailed description being provided in step S100;

a networking module 20 configured to allow that the central device obtains the Bluetooth address and the service type information corresponding to the each of the peripheral devices, and transmits a connection request to the each of the peripheral devices to establish connections between the central device and the plurality of peripheral devices, a detailed description being provided in step S200;

a wireless connection module 30 configured to allow that the central device establishes a conventional Bluetooth connection between the central device and the peripheral device according to a service request after networking, and establishes the Piconet correspondingly to allow any of two devices to be wirelessly connected according to the peripheral device service list, a detailed description being provided in step S300.

In greater detail, the advertising and scanning module 10 includes:

a first advertising unit configured to allow the each of the plurality of peripheral devices uses the connectable undirected method to periodically and dynamically advertise all the service type information and the service address information of the each of the plurality of peripheral devices to the surroundings by utilizing advertising packets under the low energy mode;

a first scan unit configured to allow the central device periodically scans the peripheral devices in a surrounding area, a scanning period being disposed to be the same as an advertising period of all the peripheral devices;

a first information acquisition unit configured to allow that the central device obtains the Bluetooth address, information of service types being supported, and the service address information corresponding to the each of the plurality of peripheral devices after one round of scanning.

In greater detail, the advertising and scanning module 10 includes:

a second advertising unit configured to allow that the each of the plurality of peripheral devices uses the connectable undirected method to periodically and dynamically advertise information of service types being supported by the each of the plurality of peripheral devices and the service address information to the surroundings by utilizing advertising packets under the low energy mode;

a second scan unit configured to allow that the central device periodically scans the peripheral devices in a surrounding area, a scanning period being set as T, if a number of types of services supported by a specific peripheral device is x, then an advertising period of the specific peripheral device being $$\frac{256T}{2^{[\log_2 x]}},$$

at the same time, a standby time being $$256T - \frac{256T}{2^{[\log_2 x]}} x,$$

where $[\log_2 x]$ represents a smallest integer that is greater than or equal to $\log_2 x$;

a second information acquisition unit configured to allow that the central device obtains the Bluetooth address, the information of service types being supported, and the service address information corresponding to the each of the peripheral devices after one round of scanning.

In sum, the interconnection method and system of networking of the Piconet based on Bluetooth low energy and conventional Bluetooth according to the present disclosure. Based on the Piconet of Bluetooth low energy, each of the plurality of peripheral devices uses a connectable undirected method to advertise the service type information whether or not supported by the plurality of wireless connections corresponding to the each of the plurality of peripheral devices and the service address information corresponding to the plurality of wireless connections to the surroundings under the low energy mode; the central device scans and obtains a Bluetooth address, the serve type information, and the service address information respectively corresponding to the each of the peripheral devices; the central device generates the peripheral device service list correspondingly according to the Bluetooth address, the serve type information, and the service address information respectively corresponding to the each of the peripheral devices so as to complete the networking between the central device and the plurality of peripheral devices; the central device establishes the conventional Bluetooth connection between the central device and the peripheral device according to the service request after the networking, and establishes the Piconet correspondingly to allow any of two devices to be wirelessly connected according to the peripheral device service list. Through establishing the Piconet, the wireless interconnection between any of the two devices including the central device and the peripheral devices can be realized. In the whole process, users operate simply. At the same time, the devices usually have an ultra-low standby power consumption. The networking of smart terminals can be automatically completed by using the function of Bluetooth low energy of the smart terminals, which is quick and convenient. When a user wants to perform a wireless connection between two smart terminals in the network, the user only needs to trigger the connection on any of the smart terminals through the function of conventional Bluetooth of the smart terminal. The interconnection is convenient to provide the user with much convenience.

The interconnection system of networking of the Piconet based on Bluetooth low energy and conventional Bluetooth according to the embodiments of the present disclosure is formed in a smart terminal. The smart terminal is, for example, a smart TV, a wireless stereo system, a smartphone, a tablet, a notebook, a computer, a wireless router, a wireless camera, a wireless projector, smart lighting, a smart window, a smart curtain, a smart refrigerator, a smart water heater, a smart printer, etc. The interconnection system of networking of the Piconet based on Bluetooth low energy and conventional Bluetooth and the interconnection method of networking of the Piconet based on Bluetooth low energy and conventional Bluetooth are from a same concept. Any of the methods provided by the embodiments of the interconnection methods of networking of the Piconets based on Bluetooth low energy and conventional Bluetooth can operate in the interconnection system of networking of the Piconet based on Bluetooth low energy and conventional Bluetooth. Since detailed implementation processes are provided in the embodiments of the interconnection methods of networking of the Piconets based on Bluetooth low energy and conventional Bluetooth, a description in this regard is not provided.

As for the interconnection method of networking of the Piconet based on Bluetooth low energy and conventional Bluetooth according to the embodiments of the present disclosure, those of ordinary skill in the art would understand that all or part of the processes of the interconnection method of networking of the Piconet based on Bluetooth low energy and conventional Bluetooth according to the embodiments of the present disclosure can be completed through using computer program instructions to control relevant hardware. The computer program instructions may be stored in a computer readable storage medium, such as being stored in a memory 40 of the smart terminal and being executed by at least one processor 50 in the smart terminal. The executing process may include the flows provided by the embodiments showing the various methods. The storage medium may be a magnetic disk, an optical disk, a read-only memory (ROM), or a random access memory (RAM), etc.

As for the interconnection system of networking of the Piconet based on Bluetooth low energy and conventional Bluetooth according to the embodiment of the present disclosure, the various functional modules may be integrated into a processing chip, or the various modules may physically exist individually, or two or more than two modules may be integrated into a module. The integrated module may be implemented by using hardware, or may be implemented by using a software functional module. If the integrated module is implemented by using the software functional module and serves as a standalone product to be sold or used, it may be stored in a computer readable storage medium. The storage medium is, for example, a read-only memory, a magnetic disk, or an optical disk, etc.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. An interconnection method of networking of a Piconet based on Bluetooth low power and conventional Bluetooth comprising:

each of a plurality of peripheral devices using a connectable undirected method to periodically and dynamically advertise service type information and service address information of the each of the plurality of peripheral devices to the surroundings by utilizing the advertising packets under a low energy mode;

a central device periodically scanning the peripheral devices in a surrounding area, a scanning period being set as T, wherein a number of types of the services supported by a specific peripheral device is x, an advertising period of the specific peripheral device being $$\frac{256T}{2^{[log_2 x]}},$$

a standby time being $$256T - \frac{256T}{2^{[log_2 x]}}x,$$

where [log$_2$ x] represents a smallest integer that is greater than or equal to log$_2$x;

the central device obtaining the Bluetooth address, information of service types being supported, and the service address information corresponding to the each of the plurality of peripheral devices after one round of scanning; the service type information being the service type information whether or not supported by a plurality of wireless connections, the service address information being the service address information corresponding to the plurality of wireless connections;

the central device generating a peripheral device service list correspondingly according to the Bluetooth address, the service type information, and the service address information corresponding to the each of the peripheral devices so as to complete networking between the central device and the plurality of peripheral devices; and the central device establishing a conventional Bluetooth connection between the central device and the peripheral device according to a service request when the central device actively triggers a service or receives a service trigger request of the peripheral device after networking, and establishing the Piconet correspondingly to allow any of two devices to be wirelessly connected according to the peripheral device service list.

2. The interconnection method as claimed in claim 1, wherein a step of the central device establishing a conventional Bluetooth connection between the central device and the peripheral device according to a service request when the central device actively triggers a service or receives a service trigger request of the peripheral device after networking, and establishing the Piconet correspondingly to allow any of two devices to be wirelessly connected according to the peripheral device service list, comprises:

the central device triggering the service request to transmit connection request signaling to a first peripheral device through the conventional Bluetooth, the first peripheral device transmitting connection response signaling to the central device through the conventional Bluetooth, the central device establishing a connection with the first peripheral device to constitute the Piconet correspondingly;

the central device transmitting connection request signaling to a second peripheral device through the conventional Bluetooth when being kept connected to the first peripheral device by using time-division multiplexing, the second peripheral device transmitting connection response signaling to the central device through the conventional Bluetooth, the central device establishing a connection with the second peripheral device to add the second peripheral device to the Piconet;

the central device transmitting the service type information, the service address information, and master/slave mode information to the first peripheral device and the second peripheral device through the Piconet; and the first peripheral device and the second peripheral device directly performing a wireless interconnection correspondingly according to the service type information, the service address information, and the master/slave mode information transmitted by the central device.

3. The interconnection method as claimed in claim 1, wherein a step of the central device establishing a conventional Bluetooth connection between the central device and the peripheral device according to a service request when the central device actively triggers a service or receives a service trigger request of the peripheral device after networking, and establishing the Piconet correspondingly to allow any of two devices to be wirelessly connected according to the peripheral device service list, comprises:

a first peripheral device transmitting connection request signaling to the central device through the conventional Bluetooth when the first peripheral device actively triggers the service request to the central device, the central device transmitting connection response signaling to the first peripheral device, the central device and the first peripheral device establishing a connection;

the first peripheral device transmitting the service type correspondingly to the central device;

the central device looking up a second peripheral device that supports same service type information as the first peripheral device from the peripheral device service list;

the central device transmitting connection request signaling to the second peripheral device through the conventional Bluetooth, the second peripheral device transmitting connection response signaling to the central device, the central device and the second peripheral device establishing a connection to constitute the Piconet correspondingly; and the central device transmitting the service type information, the service address information, and master/slave mode information to the first peripheral device and the second peripheral device through the Piconet; the first peripheral device and the second peripheral device directly performing a wireless interconnection correspondingly according to the service type information, the service address information, and the master/slave mode information transmitted by the central device.

4. The interconnection method as claimed in claim 1, wherein a step of the central device establishing a conventional Bluetooth connection between the central device and the peripheral device according to a service request when the central device actively triggers a service or receives a service trigger request of the peripheral device after networking, and establishing the Piconet correspondingly to allow any of two devices to be wirelessly connected according to the peripheral device service list, comprises:

the central device triggering the service request to transmit connection request signaling to a first peripheral device through the conventional Bluetooth, the first peripheral device transmitting connection response signaling to the central device through the conventional Bluetooth, the central device establishing a connection with the first peripheral device;

the central device transmitting the service type information, the service address information, and master/slave mode information to the first peripheral device; and the first peripheral device and the central device directly performing a wireless connection correspondingly according to the service type information, the service address information, and the master/slave mode information.

5. The interconnection method as claimed in claim 1, wherein a step of the central device establishing a conventional Bluetooth connection between the central device and the peripheral device according to a service request when the central device actively triggers a service or receives a service trigger request of the peripheral device after networking, and establishing the Piconet correspondingly to allow any of two devices to be wirelessly connected according to the peripheral device service list, comprises:

a first peripheral device triggering the service request to transmit connection request signaling to the central device through the conventional Bluetooth, the central device transmitting connection response signaling to the first peripheral device through the conventional Bluetooth, the central device establishing a connection with the first peripheral device;

the first peripheral device transmits the service type information, the service address information, and master/slave mode information to the central device; and the first peripheral device and the central device directly performing a wireless connection correspondingly according to the service type information, the service address information, and the master/slave mode information.

6. An interconnection method of networking of a Piconet based on Bluetooth low power and conventional Bluetooth comprising:

each of a plurality of peripheral devices using a connectable undirected method to periodically and dynamically advertise service type information and service address information of the each of the plurality of peripheral devices to the surroundings by utilizing the advertising packets under a low energy mode;

a central device periodically scanning the peripheral devices in a surrounding area, a scanning period being set as T, wherein a number of types of the services supported by a specific peripheral device is x, an advertising period of the specific peripheral device being $$\frac{256T}{2^{\lceil \log_2 x \rceil}},$$

a standby time being $$256T - \frac{256T}{2^{\lceil \log_2 x \rceil}} x,$$

where $\lceil \log_2 x \rceil$ represents a smallest integer that is greater than or equal to $\log_2 x$;

the central device obtaining the Bluetooth address, information of service types being supported, and the service address information corresponding to the each of the plurality of peripheral devices after one round of scanning; the service type information being the service type information whether or not supported by a plurality of wireless connections, the service address information being the service address information corresponding to the plurality of wireless connections;

the central device generating a peripheral device service list correspondingly according to the Bluetooth address, the service type information, and the service address information corresponding to the each of the peripheral devices so as to complete networking between the central device and the plurality of peripheral devices; and the central device establishing a conventional Bluetooth connection between the central device and the peripheral device according to a service request after the networking, and establishing the Piconet correspondingly to allow any of two devices to be wirelessly connected according to the peripheral device service list.

7. The interconnection method as claimed in claim 6, wherein a step of the central device establishing a conventional Bluetooth connection between the central device and the peripheral device according to a service request after the networking, and establishing the Piconet correspondingly to allow any of two devices to be wirelessly connected according to the peripheral device service list, comprises:

the central device triggering the service request to transmit connection request signaling to a first peripheral device through the conventional Bluetooth, the first peripheral device transmitting connection response signaling to the central device through the conventional Bluetooth, the central device establishing a connection with the first peripheral device to constitute the Piconet correspondingly;

the central device transmitting connection request signaling to a second peripheral device through the conventional Bluetooth when being kept connected to the first peripheral device by using time-division multiplexing, the second peripheral device transmitting connection response signaling to the central device through the conventional Bluetooth, the central device establishing a connection with the second peripheral device to add the second peripheral device to the Piconet;

the central device transmitting the service type information, the service address information, and master/slave mode information to the first peripheral device and the second peripheral device through the Piconet; and the first peripheral device and the second peripheral device directly performing a wireless interconnection correspondingly according to the service type information, the service address information, and the master/slave mode information transmitted by the central device.

8. The interconnection method as claimed in claim 6, wherein a step of the central device establishing a conventional Bluetooth connection between the central device and the peripheral device according to a service request after the networking, and establishing the Piconet correspondingly to allow any of two devices to be wirelessly connected according to the peripheral device service list, comprises:

a first peripheral device transmitting connection request signaling to the central device through the conventional Bluetooth when the first peripheral device actively triggers the service request to the central device, the central device transmitting connection response signaling to the first peripheral device, the central device and the first peripheral device establishing a connection;

the first peripheral device transmitting the service type correspondingly to the central device;

the central device looking up a second peripheral device that supports same service type information as the first peripheral device from the peripheral device service list;

the central device transmitting connection request signaling to the second peripheral device through the conventional Bluetooth, the second peripheral device transmitting connection response signaling to the central device, the central device and the second peripheral device establishing a connection to constitute the Piconet correspondingly; and the central device transmitting the service type information, the service address information, and master/slave mode information to the first peripheral device and the second peripheral device through the Piconet; the first peripheral device and the second peripheral device directly performing a wireless interconnection correspondingly according to the service type information, the service address information, and the master/slave mode information transmitted by the central device.

9. The interconnection method as claimed in claim 6, wherein a step of the central device establishing a conventional Bluetooth connection between the central device and the peripheral device according to a service request after the networking, and establishing the Piconet correspondingly to allow any of two devices to be wirelessly connected according to the peripheral device service list, comprises:

the central device triggering the service request to transmit connection request signaling to a first peripheral device through the conventional Bluetooth, the first peripheral device transmitting connection response signaling to the central device through the conventional Bluetooth, the central device establishing a connection with the first peripheral device;

the central device transmitting the service type information, the service address information, and master/slave mode information to the first peripheral device; and the first peripheral device and the central device directly performing a wireless connection correspondingly according to the service type information, the service address information, and the master/slave mode information.

10. The interconnection method as claimed in claim 6, wherein a step of the central device establishing a conventional Bluetooth connection between the central device and the peripheral device according to a service request after the networking, and establishing the Piconet correspondingly to allow any of two devices to be wirelessly connected according to the peripheral device service list, comprises:

a first peripheral device triggering the service request to transmit connection request signaling to the central device through the conventional Bluetooth, the central device transmitting connection response signaling to the first peripheral device through the conventional Bluetooth, the central device establishing a connection with the first peripheral device;

the first peripheral device transmits the service type information, the service address information, and master/slave mode information to the central device; and the first peripheral device and the central device directly performing a wireless connection correspondingly according to the service type information, the service address information, and the master/slave mode information.

11. An interconnection system of networking of a Piconet based on Bluetooth low power and conventional Bluetooth comprising:

a processor;

a memory connected with processor, the memory comprising a plurality of program instructions executable by the processor, the plurality of program instructions comprising:

an advertising and scanning module configured to cause the processor to allow that each of a plurality of peripheral devices uses a connectable undirected method to advertise service type information corresponding to the each of the plurality of peripheral devices and service address information to the surroundings under a low energy mode; a central device scans and obtains a Bluetooth address, the service type information, and the service address information respectively corresponding to the each of the peripheral devices, the service type information is the service type information whether or not supported by a plurality of wireless connections, the service address information is the service address information corresponding to the plurality of wireless connections;

a networking module configured to cause the processor to allow that the central device generates a peripheral device service list correspondingly according to the Bluetooth address, the service type information, and the service address information corresponding to the each of the peripheral devices so as to complete networking between the central device and the plurality of peripheral devices; and a wireless connection module configured to cause the processor to allow that the central device establishes a conventional Bluetooth connection between the central device and the peripheral devices according to a service request after networking, and establishes the Piconet correspondingly to allow any of two devices to be wirelessly connected according to the peripheral device service list, wherein the advertising and scanning module comprises:
a second advertising unit configured to cause the processor to allow that the each of the plurality of peripheral devices uses the connectable undirected method to periodically and dynamically advertise information of service types being supported by the each of the plurality of peripheral devices and the service address information to the surroundings by utilizing advertising packets under the low energy mode;
a second scan unit configured to cause the processor to allow that the central device periodically scans the peripheral devices in a surrounding area, a scanning period being set as T, wherein a number of types of the services supported by a specific peripheral device is x, an advertising period of the specific peripheral device being $$\frac{256T}{2^{[log_2 x]}},$$

a standby time being $$256T - \frac{256T}{2^{[log_2 x]}}x,$$

where $[log_2 x]$ represents a smallest integer that is greater than or equal to $log_2 x$;
a second information acquisition unit configured to cause the processor to allow that the central device obtains the Bluetooth address, the information of service types being supported, and the service address information corresponding to the each of the peripheral devices after one round of scanning.

12. The interconnection system as claimed in claim 11, wherein the advertising and scanning module comprises:
a first advertising unit configured to cause the processor to allow the each of the plurality of peripheral devices uses the connectable undirected method to periodically and dynamically advertise all the service type information and the service address information of the each of the plurality of peripheral devices to the surroundings by utilizing advertising packets under the low energy mode;
a first scan unit configured to cause the processor to allow the central device periodically scans the peripheral devices in a surrounding area, a scanning period being disposed to be the same as an advertising period of all the peripheral devices;
a first information acquisition unit configured to cause the processor to allow that the central device obtains the Bluetooth address, information of service types being supported, and the service address information corresponding to the each of the plurality of peripheral devices after one round of scanning.

\* \* \* \* \*